April 10, 1934.    C. E. DOOLIN    1,954,443
DOUGH DISPENSING AND CUTTING DEVICE
Filed Sept. 20, 1933    2 Sheets-Sheet 1
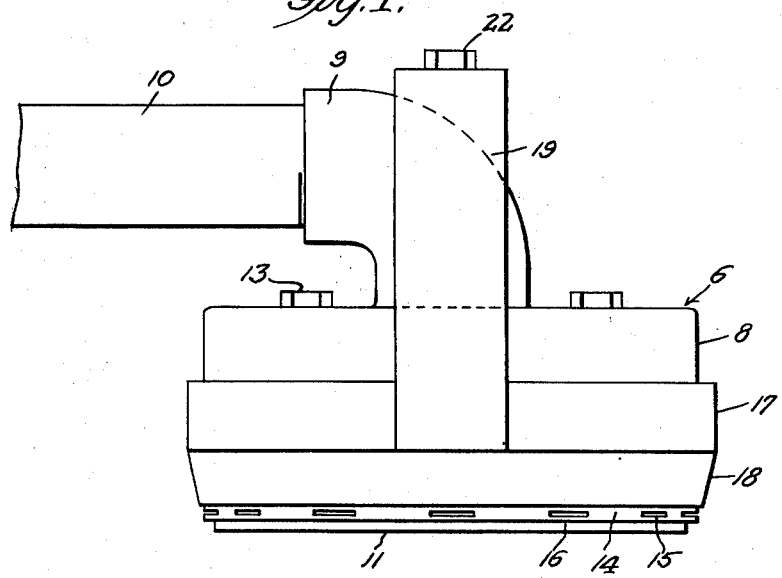
Inventor
C. E. Doolin,
By Clarence A. O'Brien
Attorney April 10, 1934.  C. E. DOOLIN  1,954,443
DOUGH DISPENSING AND CUTTING DEVICE
Filed Sept. 20, 1933   2 Sheets-Sheet 2
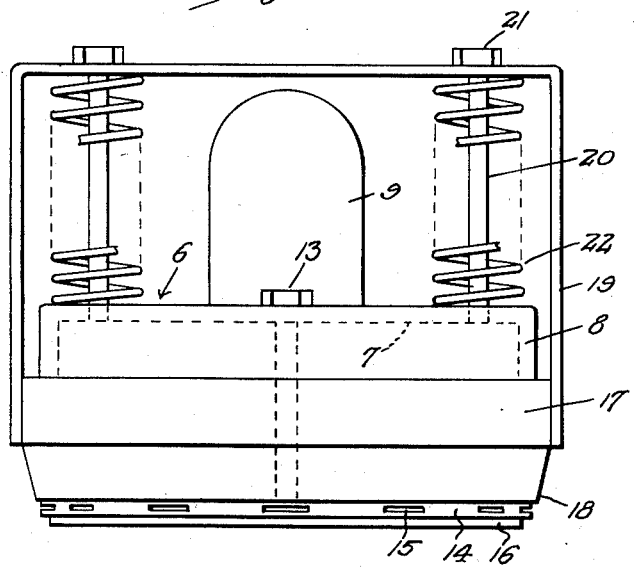
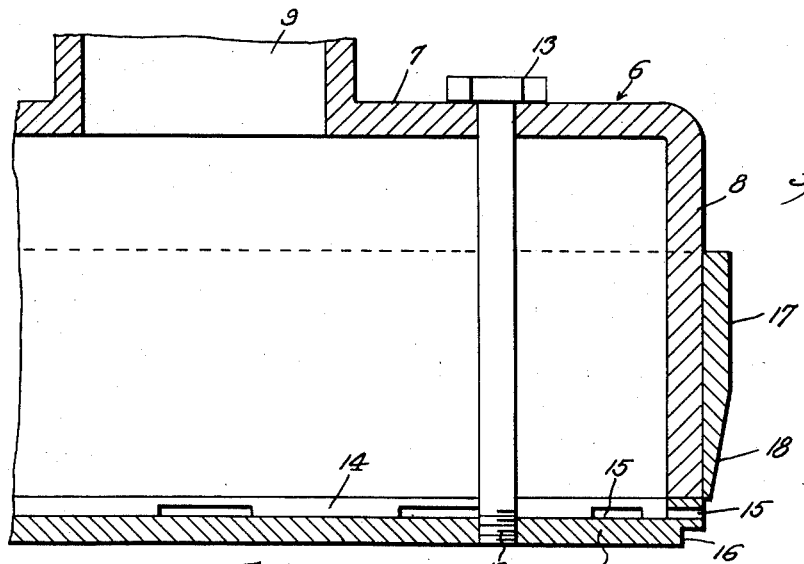
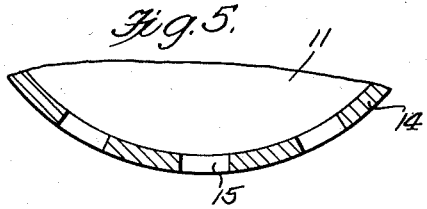
Inventor
C. E. Doolin,
By Clarence A. O'Brien, Attorney Patented Apr. 10, 1934

1,954,443

UNITED STATES PATENT OFFICE 1,954,443

DOUGH DISPENSING AND CUTTING DEVICE

Charles Elmer Doolin, San Antonio, Tex.

Application September 20, 1933, Serial No. 690,261

3 Claims. (Cl. 107—14)

This invention relates to a device for dispensing and cutting especially prepared dough in a manner to cut the dough into pieces of a predetermined size or shape and to permit the pieces to be conveniently dropped into hot grease for frying or cooking purposes.

The purpose of the invention will be better understood by first considering my desire to provide practical and efficient means whereby dough of proper consistency and ingredients is adapted to be injected into the device and ejected from said device in the form of strips or ribbon-like pieces cut off in predetermined lengths and allowed to drop into hot greases for preparing fried dough products for human consumption.

In carrying the principles of the preferred embodiment of the invention into actual practice, I have evolved and produced a structure which is aptly fitted for the purpose and whose features of accommodation and adaptation transcend those of similar cutting and dispensing devices, whereby to provide a device characterized by efficiency and economy calculated to fulfill the requirements of an invention of this type in a practical and dependable manner.

The mechanical details selected for accomplishing these results will become more readily apparent from the following description and drawings. In the drawings:

Figure 1 is a side elevational view of a device constructed in accordance with the present invention showing the preferred style and embodiment thereof.

Figure 2 is a top plan view of Figure 1.

Figure 3 is a front elevational view.

Figure 4 is an enlarged fragmentary sectional and elevational view.

Figure 5 is a fragmentary horizontal section.

Referring now to the drawings by distinguishing reference characters, it will be observed that the device comprises a hollow dough receiving and dispensing head 6 of appropriate dimensions, material, shape, and size. In the preferred embodiment it is shown as being of circular form, though it may be of rectangular, triangular, or any other shape. As shown in Figure 4 it comprises an annular flat top 7 and a depending marginal flange or rim 8.

Attached to the center of the top is an elbow or equivalent union 9 with which the dough supply pipe 10 is connected. The bottom plate is in the form of a detachable disc 11 having screw-threaded holes to accommodate the screw-threaded ends 12 of retaining bolts 13 carried by the body portion of the head. The plate 11 is provided with a marginal upstanding rim 14 having slots 15 of appropriate shape through which the dough (not shown) is ejected. This rim is offset outwardly to some extent as shown in Figure 4, allowing it to project beyond the marginal edge or periphery 16 of the bottom disc. This arrangement is provided to prevent hanging or adhesion of dough and to promote effective action of the cutter ring 17. The cutter ring surrounds the rim 8 and has its lower end beveled as at 18 to provide a suitable cutting edge.

The cutter ring is actuated through the instrumentality of a yoke 19 whose arms are attached to the ring at diametrically opposite points. The bight or connecting portion of the yoke is slidably mounted on guide studs or pins 20 secured to the top 7 of the head, the upper ends of said pins being provided with detachable retaining nuts 21 to facilitate removal and cleaning of the cutter. The numerals 22 merely designate expansion coil springs which surround the pins between the top plate 7 and yoke as shown in Figure 3. These springs serve to return the cutting ring to a normally ineffective position.

The gist of the invention is in the provision of a hollow head of appropriate proportions and shape having a feed pipe for the dough, whereby to permit the dough to be delivered under pressure into said head. The bottom plate of the head is removable for cleaning purposes and provided with an apertured rim which determines the shape of the strips or pieces of dough ejected from said head. Slidably mounted on the rim portion of the head for limited reciprocation is the cutting ring whose lower cutting edge 18 cooperates with the slot 15 to cut off the strips of dough in appropriate or predetermined lengths. The spring 22 serves to normally and automatically return the cutter to the position shown in the drawings.

The cutter has a limited downward movement under the action of the yoke 19 which is forced down by hand or otherwise for conveniently cutting off the dough strips. In practice, the device when in use is located over the receptacle or pan containing the boiling grease and as the strips are forced out through the openings 15 they are shaped to define ribbons of dough. These ribbons are cut off at appropriate lengths under the depressed action of the cutter and allowed to drop into the grease for cooking purposes.

Specific structural novelty is thought to reside in the provision of a hollow head of appropriate proportions having a bolt retained removable bottom or disc which is in turn provided with a laterally offset apertured rim held firmly against the rim of the body portion of the head by the bolt, the offsetting of the rim serving to facilitate clipping or cutting of the ribbons of dough when the spring returned cutter is depressed. It is to be observed that the head occupies a position substantially parallel to the delivery pipe through which the dough is fed under pressure into said head. The removability of the disc plate or bottom 11 is designed to permit access to be had to the interior of the head for cleaning the body as well as the bottom plate itself. This promotes sanitation.

Additional novelty is found in the provision of the reciprocatory spring-returned cutter equipped ring 17 and the actuating yoke 19 therefor which yoke is sustained in place by the retaining pins or studs 20 and returned to non-cutting position by the springs 22. Here again, the entire cutter unit including the nut 21 and springs 22 is removable for cleaning and repair purposes.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions and materials may be resorted to in practice without departing from the spirit of the invention or the scope of the invention as now claimed.

I claim:

1. A dough dispensing and cutting device of the class described comprising a hollow head, the bottom portion of said head being provided with elongated slots through which the dough is forced and formulated into ribbon-like pieces, a delivery pipe connected with said head to convey the dough into the head under pressure and for ejection purposes, a cutter mounted for reciprocation on the head and in close proximity to said slots for severing the ribbon-like pieces into predetermined lengths, and a spring-returned operating yoke for said cutter.

2. A dough dispensing and cutting device of the class described comprising a hollow circular head provided in its top with an upstanding elbow forming an inlet union, a delivery pipe attached to said union and disposed in parallelism to the top side of said head, the depending marginal portion of said head constituting a rim, a disc-like bottom formed on its marginal portion with an outwardly offset slotted rim detachably secured to the lower edge portion of said first-named rim, a cutter ring mounted for reciprocation on the exterior of said head rim and the lower edge portion of said ring being bevelled to provide a cutting edge in co-operation with the slots, a yoke secured to said cutter ring for operating the same, and return springs for said yoke.

3. A dough dispensing and cutting device of the class described comprising a circular hollow head embodying a flat disc-like top having a central opening and a communicating elbow attached thereto, the depending flange portions of said head constituting a rim, a dough delivery pipe connected with said elbow and disposed in parallelism to the top of said head, a disc-like bottom, said bottom embodying a marginal offset slotted rim of a diameter corresponding to the rim of said head, and means for securing said disc-like bottom removably in place, a cutting ring surrounding the rim of the head and having its lower end bevelled to provide a cutting edge, said cutting edge being co-operable with said slots, a U-shaped yoke having its depending arm portions attached to diametrically opposite portions of said ring, the bight portion of said yoke overlying said elbow, diametrically opposed upstanding studs on said head extending upwardly through slots in the bight portion of the yoke, retaining nuts on the upper threaded ends of said studs, and coiled return springs surrounding the studs between the head and bight portion of the yoke.

CHARLES ELMER DOOLIN.